(12) United States Patent
Watanabe

(10) Patent No.: US 6,193,225 B1
(45) Date of Patent: Feb. 27, 2001

(54) NON-LINEAR NON-CIRCULAR COILED SPRING

(75) Inventor: Kotaro Watanabe, Machida (JP)

(73) Assignee: Tama Spring Co., Ltd., Tokyo (JP)

( * ) Notice: Subject to any disclaimer, the term of this patent is extended or adjusted under 35 U.S.C. 154(b) by 0 days.

(21) Appl. No.: 09/268,875

(22) Filed: Mar. 16, 1999

(51) Int. Cl.$^7$ .................................................. A61F 1/06
(52) U.S. Cl. ..................... 267/180; 267/248; 267/288; 267/289; 267/167; 267/170; 267/174
(58) Field of Search .................................. 267/248, 271, 267/272, 286, 288, 289, 155, 166.1, 167, 168, 170, 174, 180, 166

(56) References Cited

U.S. PATENT DOCUMENTS

| | | | |
|---|---|---|---|
| 338,267 | * 3/1886 | Hearle | 267/166 |
| 1,963,054 | * 6/1934 | Powers | 267/166 |
| 2,586,646 | * 2/1952 | Graham | 267/180 |
| 3,068,666 | * 12/1962 | Sabadash | 267/180 |
| 5,678,809 | * 10/1997 | Nakagawa et al. | 267/166 |
| 5,944,302 | * 8/1999 | Loc et al. | 267/166 |

FOREIGN PATENT DOCUMENTS

| | | | |
|---|---|---|---|
| 0508271 | * 10/1920 | (FR) | 267/286 |
| 0063139 | * 5/1981 | (JP) | 267/180 |
| 6081528 | * 10/1983 | (JP) | 267/166 |
| 4262132 | * 4/1992 | (JP) | 267/166 |

* cited by examiner

*Primary Examiner*—Christopher P. Schwartz
*Assistant Examiner*—Devon Kramer
(74) *Attorney, Agent, or Firm*—Leighton K. Chong

(57) ABSTRACT

A non-linear non-circular coiled spring comprises a first coil portion of rectangular cross-section having a lateral length "a" and a longitudinal length "b", a second coil portion of rectangular in cross-section having a lateral length "b" and a longitudinal length "a", and a transition coil portion connecting the first coil portion and the second coil portion by gradually twisting one of first and second coil portions toward the other of first and second portions. The non-linear non-circular coiled spring is adapted to be used as a car suspension or a machine spring.

6 Claims, 7 Drawing Sheets

$k_2/k_1 = 1.4$

NON-LINEAR NON-CIRCULAR COILED SPRING

BACKGROUND OF THE INVENTION

This invention relates in general to a non-linear non-circular coiled spring, and in particular to a non-linear non-circular coiled spring having twisted transition portions for providing a non-linear property.

FIG. 5 is a side view showing a conventional typical non-linear coiled spring. In FIG. 5, a non-linear coiled spring 10 is circular in spring cross-section, and obtains a non-linear property, in which the spring constant changes with the value of load. In other words, the load-deflection property is not linear, that is, non-linear by varying its pitch in an "A" region and a "B" region in an axial direction, or by making an unequal-pitch spring.

FIG. 6 is a graph showing the load-deflection property or spring constant of the above-mentioned non-linear coiled spring. In FIG. 6, the resultant value of the spring in the A region and the B region is $K_1$, and the value of the spring constant in the B region is $K_2$. The value of the varied ratio $K_2/K_1$ of the spring constant is approximately 1.4. Therefore, it is difficult to obtain a larger varied ratio due to the fact that a pitch in one region must be made far larger than in the other region in manufacturing, etc.

In the meantime, there is a non-circular coiled spring of rectangular, including square, cross-section, different from the coiled spring of circular cross-section. FIG. 7 is a side view, including a sectional view, showing a conventional non-circular coiled spring. In FIG. 7, the non-circular coiled spring 20 is rectangular in cross-section, in which its longitudinal length is "b", and its lateral length or width is "a". When it is completely compressed, the upper surface portions and lower surface portions of the spring are, respectively, engaged with each other, and therefore this spring provides more stability than the coiled spring of circular in cross-section, which result in less occurrence of damage. Moreover, this spring can obtain a larger deflection, and can vary the spring constant by change of pitch as well as change of ratio of longitudinal length to lateral length.

In general, when the usage of the coiled spring is considered, it is applicable as a mechanical spring or as a car suspension spring. Since the non-linear non-circular coiled spring in accordance with the present invention is particularly adapted to be used as a car suspension spring and a mechanical spring, the explanation will be made with regard to a conventional suspension spring and a conventional mechanical spring.

FIG. 8 is a side view showing a prototype of a car suspension. In FIG. 8, the suspension comprises a suspension spring 30, washers 32 and 34 attached to the spring 30 at its opposite ends, an attachment member 35, a shaft 36 extending from the attachment member 35 through the spring 30, and a nut 38 attached to the shaft 36 at its thread portion.

In use, the suspension is used in a condition that the attachment member 35 is disposed downward. The attachment member 35 is attached to the frame, not shown, of the wheel side, the frame of the car body is positioned on washer 34, and is prevented by the nut 38 from separating from the suspension. This suspension is used as a suspension itself as well as a damper.

However, when it is used as a damper, it is preferred that the damper supports the weight of the car body to be deflected largely. On the other hand, when it is used as a suspension, it is preferred that the deflection in the suspension is smaller to absorb more effectively the vibration generated when the car running. The conventional suspension spring of this type could not satisfy both spring properties, that is, large deflection property and small deflection property.

An improved car suspension was proposed in order to eliminate the above-mentioned disadvantages. FIG. 9 is a side view showing the conventional improved car suspension. In FIG. 9, in the suspension, another washer 32' is added between the washer 32 and 34 of the suspension shown in FIG. 8 and another auxiliary spring, a so-called helper spring 30' is added between the washer 32 and 32'. The coiled spring of circular in cross-section is used as a main spring 30 and the non-circular coiled spring which can have a large value of deflection is used as a helper spring 30'. The helper spring 30' is designed to have a value of deflection so that the spring should be completely compressed by the weight of the car, and its upper surface portions and lower surface portions are engaged with each other, which results in no clearance or gap. Consequently, only main spring 30 functions as a suspension.

FIG. 10 is a side view showing a conventional mechanical spring. In FIG. 10, with the mechanical spring, two springs which have different spring constants, that is, a main spring 40 for high load and a sub-spring 40' for low load, are disposed on the upper and lower sides of the washer 42. The arrangement of the springs is used in a machine such as a press. In addition to the spring 40, the spring 40' is disposed in series with the spring 40 in order to preclude play by the strokes made in the machine.

As mentioned above, although the non-circular coiled spring is used in accordance with the usage in place of the coiled spring of circular in cross-section, there has been no non-circular coiled spring which has a non-linear property. In order to provide a non-circular coiled spring with a non-linear property it is in general considered that the pitch is varied in a similar manner to the coiled spring of circular in cross-section as shown in FIG. 5. In such a case, it is difficult to set a large varied ratio of spring constant.

In the meanwhile, in the improved car suspension, two different types of coiled springs are used, and in addition more washers are required, and therefore a larger number of necessary members is required.

Furthermore, for the machine spring, two springs of different spring constants, and the washer therebetween are used, and therefore there is also a disadvantage that a larger number of necessary members is required.

SUMMARY OF THE INVENTION

It is, therefore, an object of the invention is to provide a non-linear non-circular coiled spring which can set a large varied ratio of spring constant.

It is a further object of the invention is to provide a nonlinear non-circular coiled spring which is adapted to be used in a car suspension or a machine.

In order to accomplish the above-mentioned objects, there is provided a non-linear non-circular coiled spring which comprises a first coil portion of rectangular in cross-section having a lateral length "a" and a longitudinal length "b", a second coil portion of rectangular in cross-section having a lateral length "b" and a longitudinal length "a", and a transition coil portion connecting said first coil portion and said second coil portion by gradually twisting one of said first and second coil portions toward the other of said first and second coil portions.

There is also provided a non-linear non-circular coiled spring of the above-mentioned type in which when the non-linear non-circular coiled spring is used as a car suspension, the coil portion of said first and second coil portions where the value of the deflection is larger is used as a damper for supporting the weight of the car body and the coil portion of said first and second coil portions where the value of the definition is smaller is used as a suspension for absorbing the vibration generated when the car is running.

There is also provided a non-linear non-circular coiled spring of the above-mentioned type in which when the non-linear non-circular coiled spring is used as a machine spring in a press machine, the coil portion of said first and second coil portions where the value of the deflection is larger is used to preclude clearance at the strokes made in the machine and the coil portion of said first and second coil portions where the value of the deflection is smaller is used as a main spring.

BRIEF DESCRIPTION OF THE DRAWINGS

The above and other objects of the invention will be seen by reference to the discription taken in connection with the accompanying drawings, in which.

DESCRIPTION OF THE INVENTION

Figure 1:
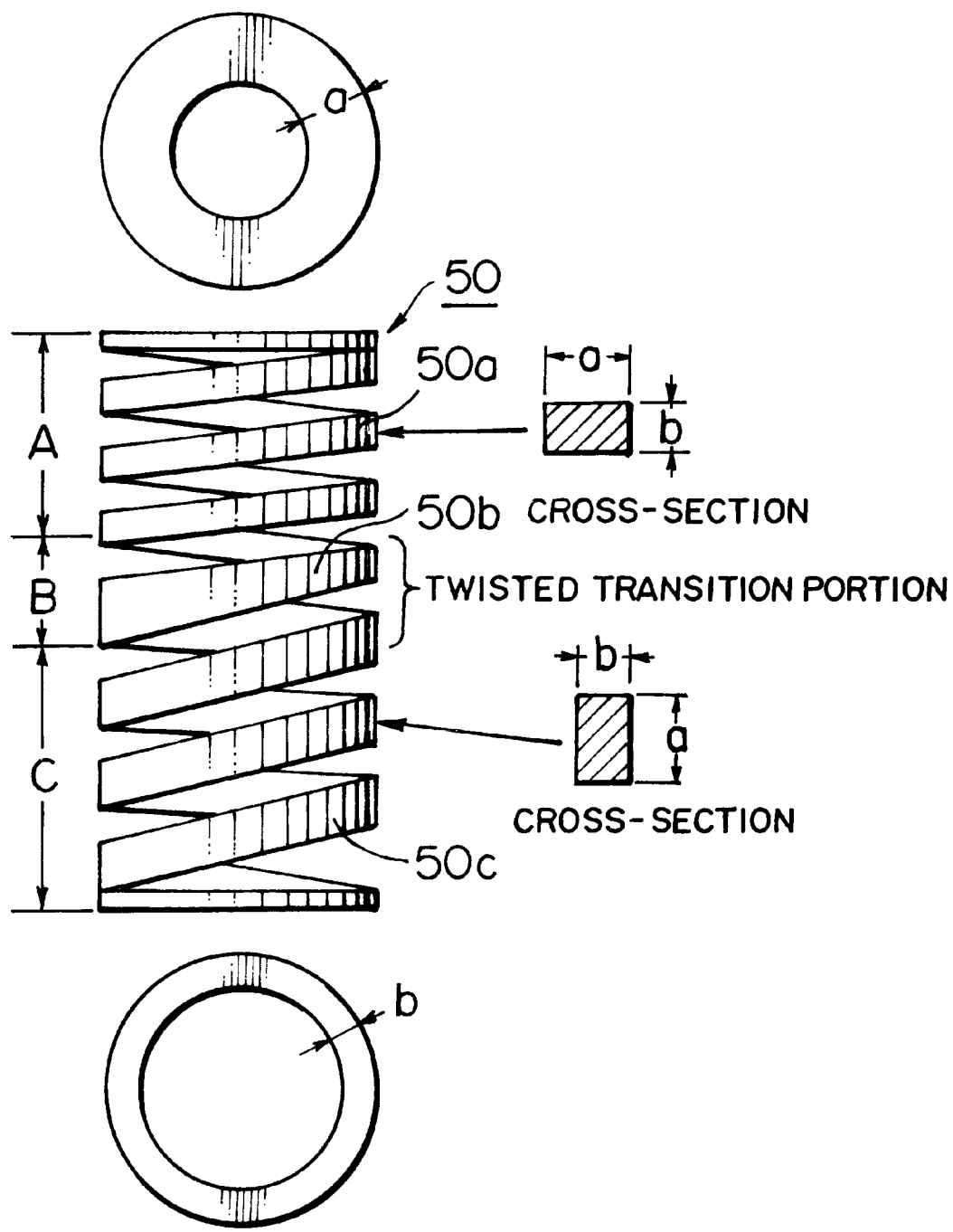
FIG. 1 is a side view, including upper and bottom views, showing a first embodiment of a non-linear non-circular coiled spring according to the present invention.

Referring to FIG. 1, a non-linear non-circular coiled spring 50, hereinafter referred to as coiled spring, comprises a non-circular coil portion 50a of the coiled spring in the region "A" having a rectangular cross-section of a longitudinal length "b" and lateral length or width "a".

The coiled portion 50b in the region "B" is a twisted transition portion in which it is gradually twisted, more specifically twisted about a normal direction in wire section, to change the longitudinal portion to the lateral portion and change the lateral portion to the longitudinal portion. Consequently, the portion 50c of the coiled spring in the region "C" has a rectangular cross-section of a londitudinal length "a" and lateral length "b".

Figure 2:
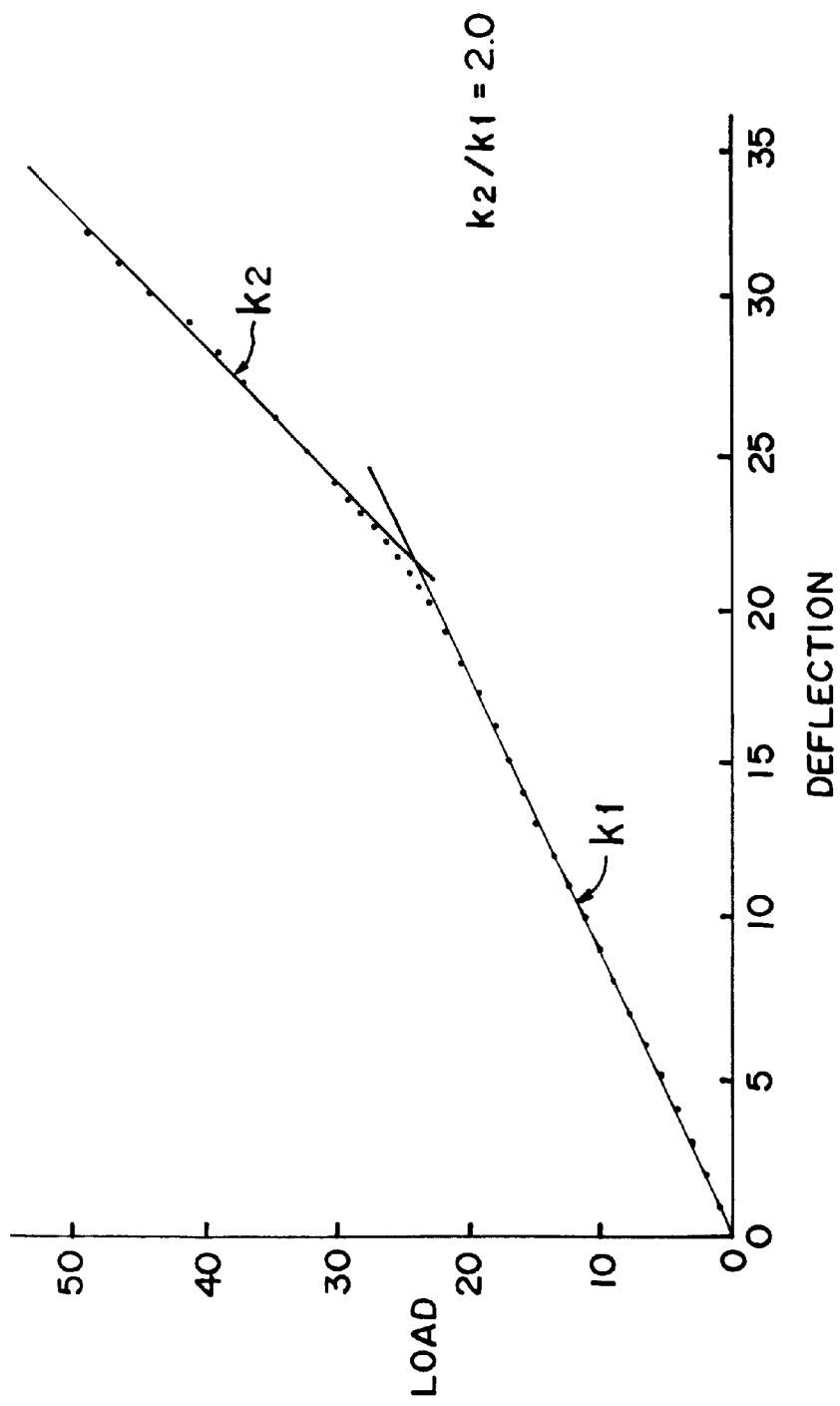
FIG. 2 is a graph showing a load-deflection property of the coiled spring of the first embodiment.

Now referring to FIG. 2 showing a graph of load-deflection property of the coiled spring of the first embodiment, the resultant spring constant of the region "A", "B" and "C" is $K_1$, and the spring constant of the portion 50b of the coiled spring in the region "B" is $K_2$. When the coiled spring in accordance with the embodiment is prepared and tested, the varied ratio($K_2/K_1$) of spring constant was 2.0. Comparing with the varied ratio of the conventional spring constant, 1.4, the value 2.0 is relatively large. Furthermore, if the ratio of the longitudinal length in cross-section is set to be made larger a, larger varied ratio of spring constant can be obtained.

Figure 3:
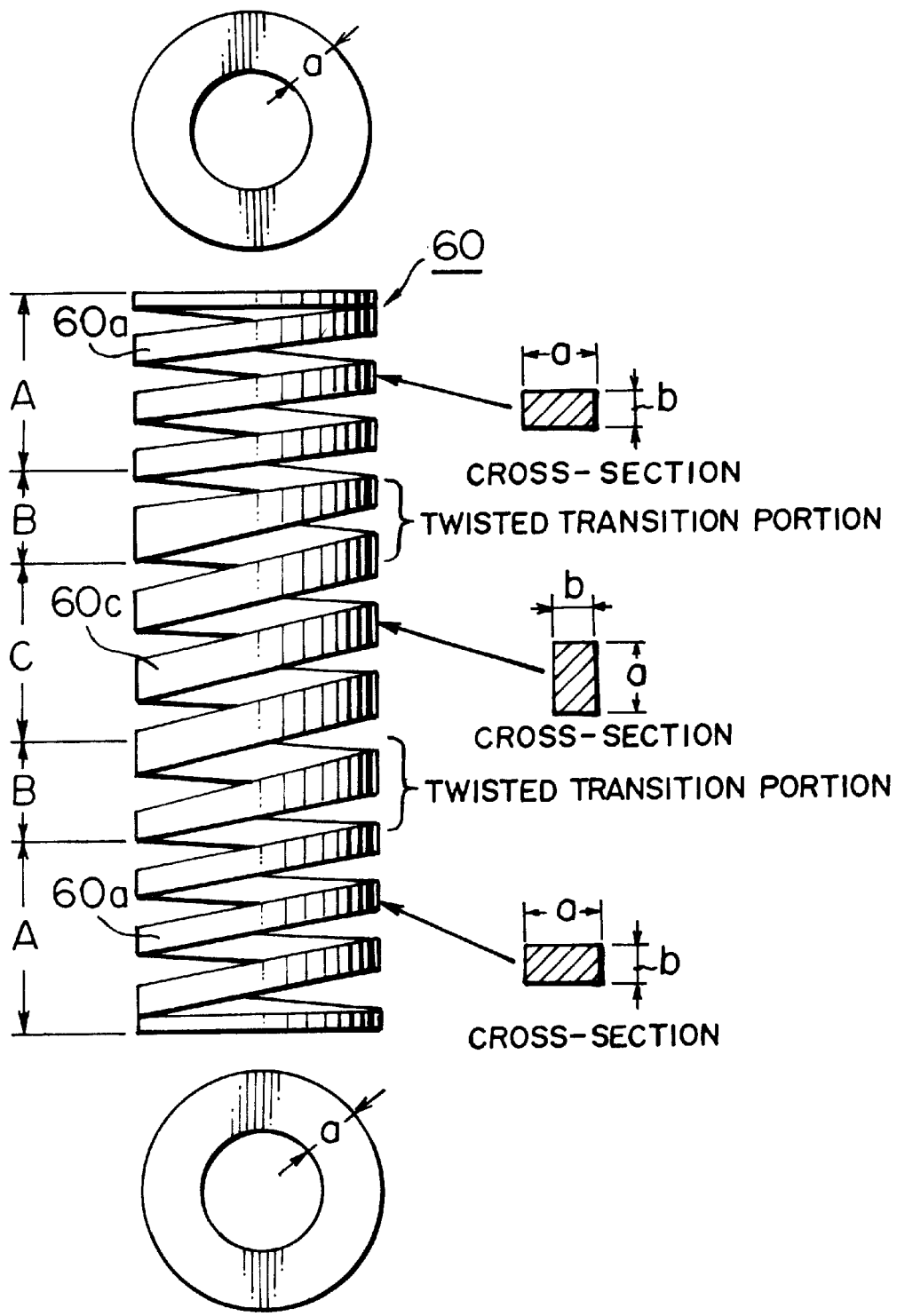
FIG. 3 is a side view, including upper and bottom views, showing a second embodiment of a non-linear non-circular coiled spring.

Referring to FIG. 3 showing the side view of a second embodiment of the coiled spring, although the first embodiment provided with a single twisted transition portion, the coiled spring 60 is provided with two twisted transition portions 60b and 60b. More specifically, the portion 60a and 60a each of which has a longitudinal length "b" and a lateral length "a" in cross-section are formed on the upper and lower portion, and the portion 60c which has a longitudinal length "a" and a lateral length "b" in cross-section is formed in the middle, and there are twisted transition portions 60b and 60b between them. This coiled spring has a non-linear property similar to that of the first embodiment.

Figure 4:
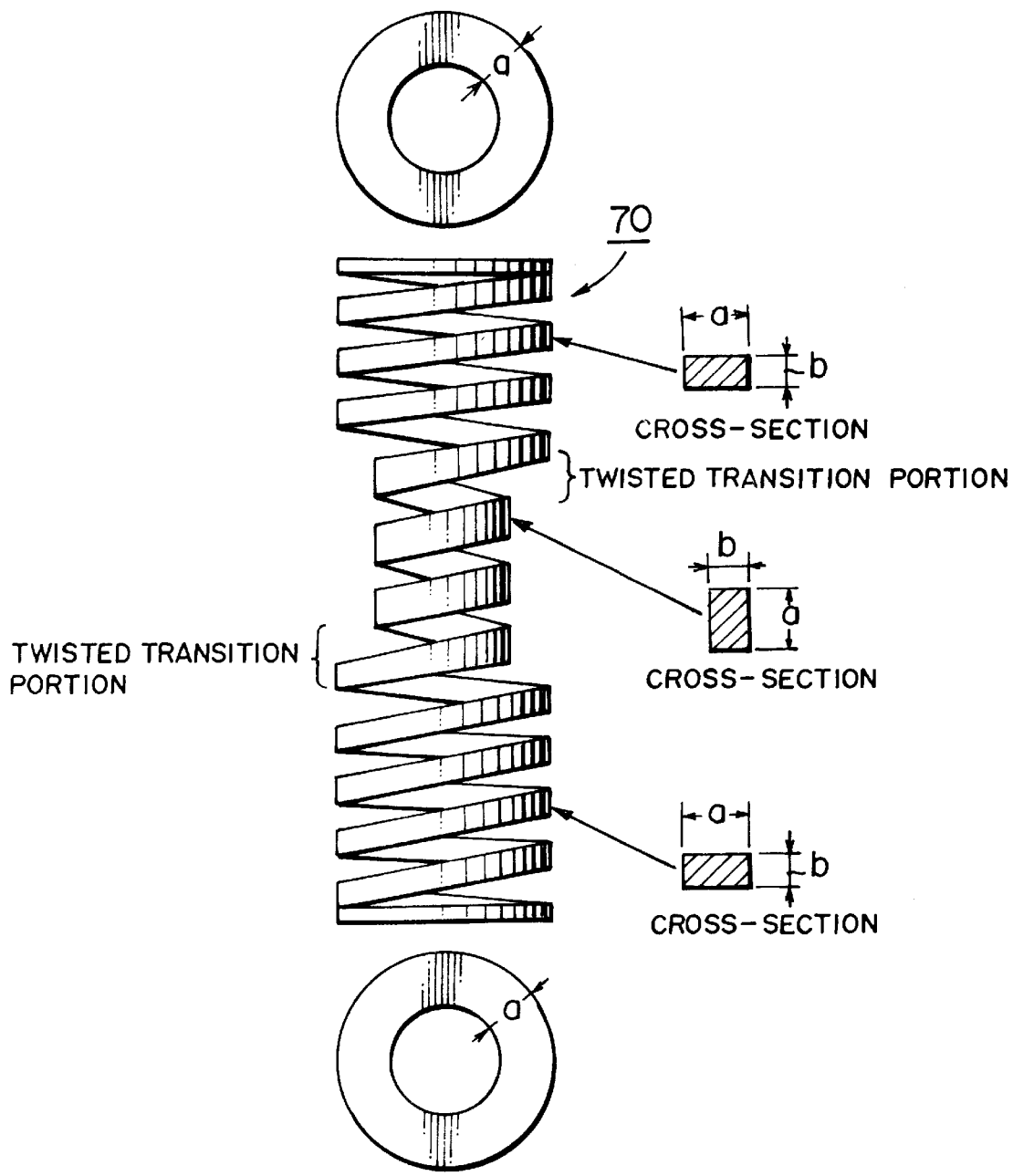
FIG. 4 is a side view, including upper and bottom views, showing a third embodiment of a non-linear non-circular coiled spring.
Figure 5:
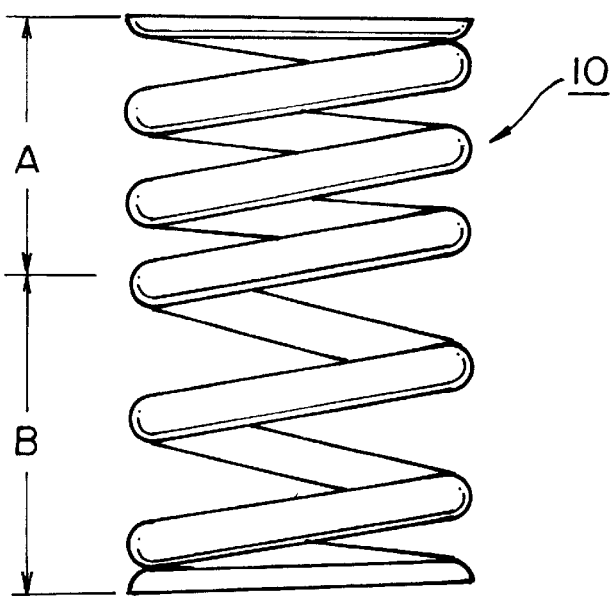
FIG. 5 is a side view showing a typical conventional non-linear coiled spring.

Referring to FIG. 4 showing a side view, including upper and lower views, for a third embodiment of a coiled spring, although the first and second embodiments have the size of the outer diameter of the coiled spring equal throughout in the normal direction, in this third embodiment,the size of the inner diameter of the coiled spring is made to be equal throughout in the normal direction Furthermore, the other portions are similar to those of the second embodiment, and therefore the detailed explanation thereof will be omitted.

Although the first, second and third embodiments are directed to the construction of the coiled spring itself, a fourth embodiment is directed to the usage of these coiled springs. The coiled spring according to the present invention is adapted to be applied to a car suspension. In place of the conventional coiled spring 30 described with reference to FIG. 3, the coiled spring 50, 60 or 70 can be used.

Figure 6:
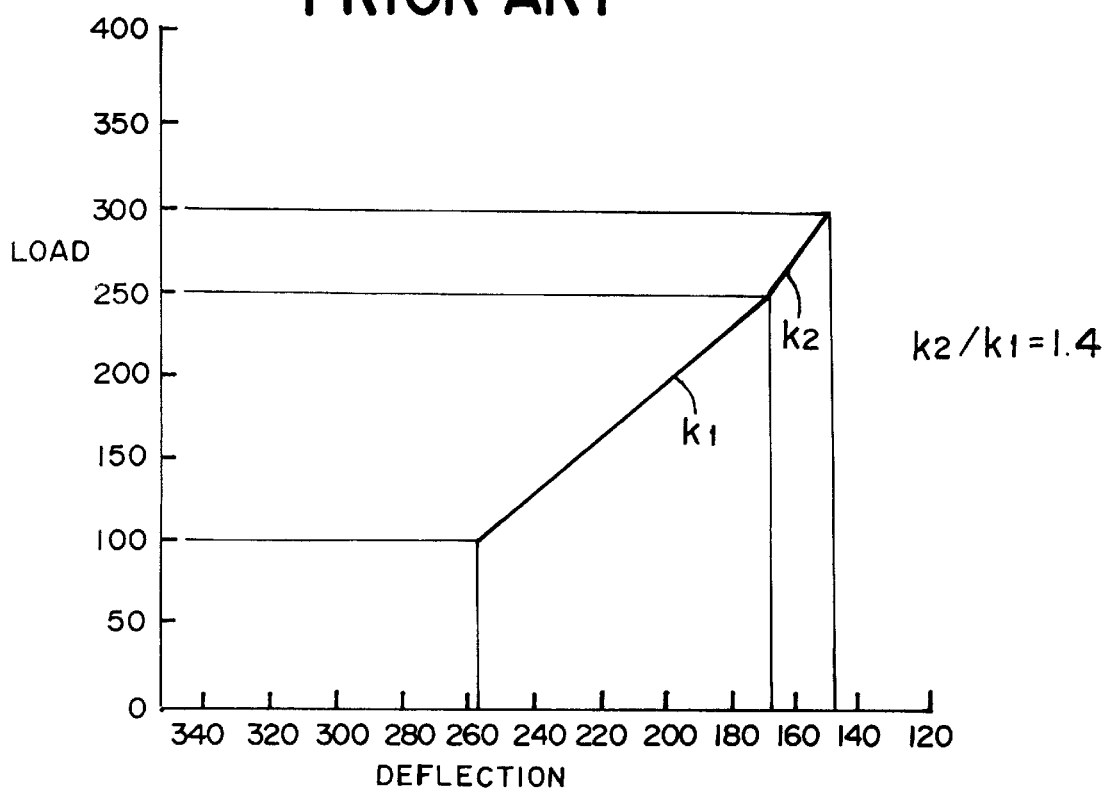
FIG. 6 is a graph showing a load-deflection property of the above-mentioned non-linear coiled spring.
Figure 7:
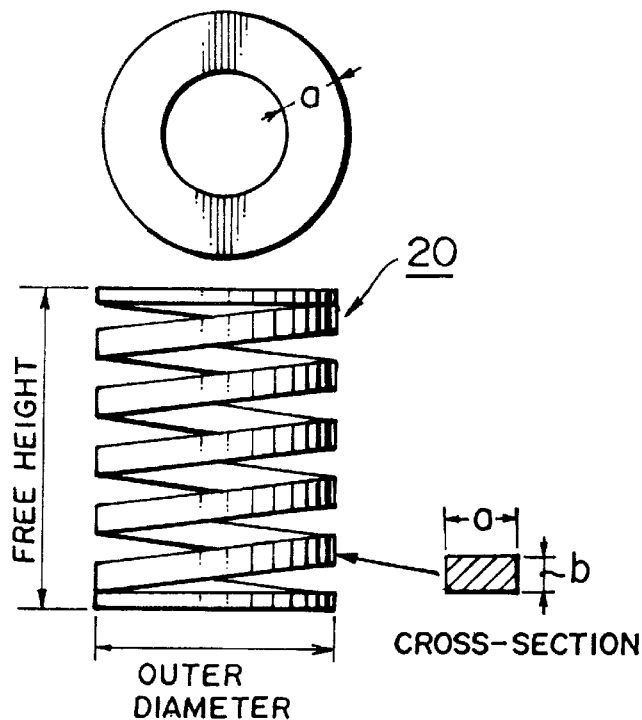
FIG. 7 is a side view, including upper view showing a conventional non-circular coiled spring.
Figure 8:
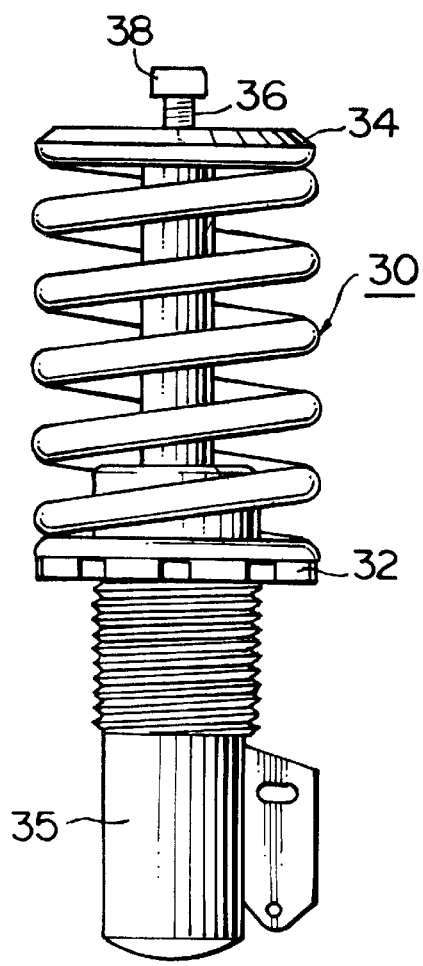
FIG. 8 is a side view showing a conventional prototype of a car suspension.
Figure 9:
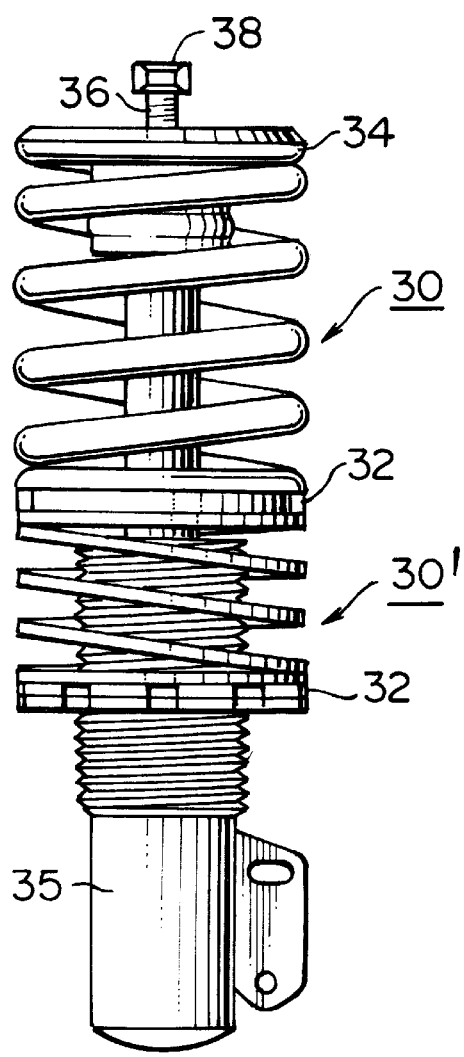
FIG. 9 is a side view showing a conventional improved car suspension.
Figure 10:
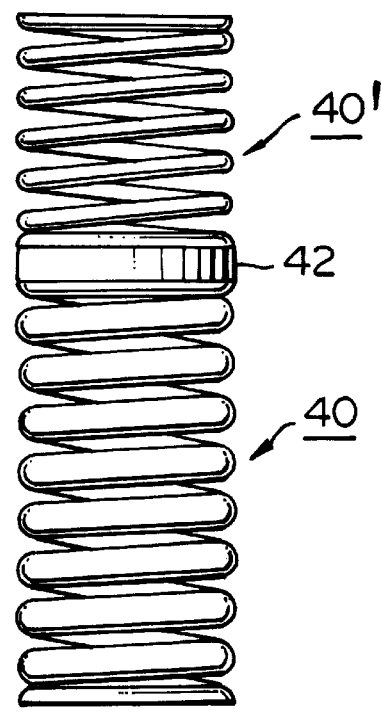
FIG. 10 is a side view showing a conventional spring for a machine.

In such a case, the value of the delection in which the spring constant corresponds to $K_2$ is set to eliminate clearance. Consequently, two different coiled springs as used in the conventional improved suspension described with reference to FIG. 6 are not necessary.

Although the coiled spring according to the present invention is adapted to be used in the car suspension, it also can be used as a machine spring as required for non-linear property. Furthermore, although in the first through forth embodiments, the coiled spring is explained as a compressed spring, the present invention is not limited to the compressed spring, and is applicable to a tension spring or a twisted spring.

What I claim:

1. A non-linear non-circular coiled spring extending along a spring axis comprising:
    a first coil portion having an uniform outer coil diameter and an uniform inner coil diameter relative to a normal direction to the spring axis, even pitch spacing, and a rectangular cross section having a lateral length (a) in the normal direction and a longitudinal length (b) in the direction of the spring axis,
    a second coil portion having an uniform outer coil diameter and an uniform inner coil diameter relative to the normal direction, uniform ditch spacing, and a rectangular cross section having a lateral length (b) in the normal direction and a longitudinal length (a) in the direction of the spring axis, and
    a transition coil portion having an uniform outer coil diameter and an uniform inner coil diameter relative to the normal direction and connecting said first coil portion and said second coil portion by gradually twisting one of said first and second coil portions toward the other of said first and second coil portions, wherein the lengths (a) and (b) are not equal to each other, and the first coil portion has a different spring constant resulting in a different spring deflection value as compared to the second coil portion.

2. A non-linear non-circular coiled spring according to claim 1 which includes at least one first coil portion, at least one second coil portion and at least two twisted transition coil portions.

3. A non-linear non-circular coiled spring according to claim 1 in which the outer diameters of said first coil portion and said twisted coil portion are equal.

4. A non-linear non-circular coiled spring according to claim 1 in which the inner diameters of said first coil portion, said second coil portion and said twisted coil portion are equal.

5. A non-linear non-circular coiled spring according to claim 1 in which when the non-linear noncircular coiled spring is used as a car suspension of the type having a damper spring combined with a suspension spring, the coil portion of said first and second coil portions where the spring deflection value is larger than the other of said coil portions is used as a damper spring for supporting car weight, and the coil portion of said first and second coil portions where the spring deflection value is smaller than the other of said coil portions is used as a suspension spring for damping car vibration.

6. A non-linear non-circular coiled spring according to claim 1 in which when the non-linear noncircular coiled spring is used as a machine spring of the type having a clearance-precluding spring combined with a main spring, the coil portion of said first and second coil portions where the spring deflection value is larger than the other of said coil portions is used as a spring to preclude clearance at machine strokes and the coil portion of said first and second coil portions where the spring deflection value is smaller than the other of said coil portions is used as a main spring.

* * * * *